United States Patent [19]

Suzuki

[11] Patent Number: 4,791,569
[45] Date of Patent: Dec. 13, 1988

[54] ELECTRONIC CONTROL SYSTEM FOR INTERNAL COMBUSTION ENGINES

[75] Inventor: Yoshio Suzuki, Wakoh, Japan

[73] Assignee: Honda Giken Kogyo Kabushiki Kaisha, Tokyo, Japan

[21] Appl. No.: 840,583

[22] Filed: Mar. 17, 1986

[30] Foreign Application Priority Data

| Mar. 18, 1985 | [JP] | Japan | 60-52505 |
| Apr. 5, 1985 | [JP] | Japan | 60-71101 |
| May 31, 1985 | [JP] | Japan | 60-117962 |
| May 31, 1985 | [JP] | Japan | 60-117961 |
| May 31, 1985 | [JP] | Japan | 60-82038[U] |

[51] Int. Cl.⁴ .................... F02M 51/00
[52] U.S. Cl. ............ 364/431.04; 364/431.11; 364/133; 371/9
[58] Field of Search ......... 364/431.04, 431.05, 364/431.06, 431.11, 133, 134; 371/9, 12; 123/479; 377/20

[56] References Cited

U.S. PATENT DOCUMENTS

| 4,153,198 | 5/1979 | Eki et al. | 364/133 |
| 4,532,594 | 7/1985 | Hosaka et al. | 371/9 |
| 4,558,416 | 12/1985 | Pauwels et al. | 364/431.11 |
| 4,598,371 | 7/1986 | De Angelis et al. | 364/431.04 |
| 4,600,993 | 7/1986 | Pauwels et al. | 364/431.05 |

*Primary Examiner*—Parshotam S. Lall
*Attorney, Agent, or Firm*—Lyon & Lyon

[57] ABSTRACT

An electronic control system for an internal combustion engine comprises first and second central processing units connected, respectively, with a fuel supply device and an ignition device for the engine. First and second sensors are connected, respectively, to the first and second central processing units for supplying their detected values to respective central processing units. Transfer lines are connected between the two central processing units for transferring detected values from the sensors from one of the central processing units to which the sensors are connected, to the other, and vice versa. The second sensor detects predetermined engine crank angle positions and supplies the resulting timing signal to the second central processing unit, which is responsive to the timing signal for supplying a trigger signal to the first central processing unit to cause same to start calculation of fuel supply quantity.

7 Claims, 8 Drawing Sheets

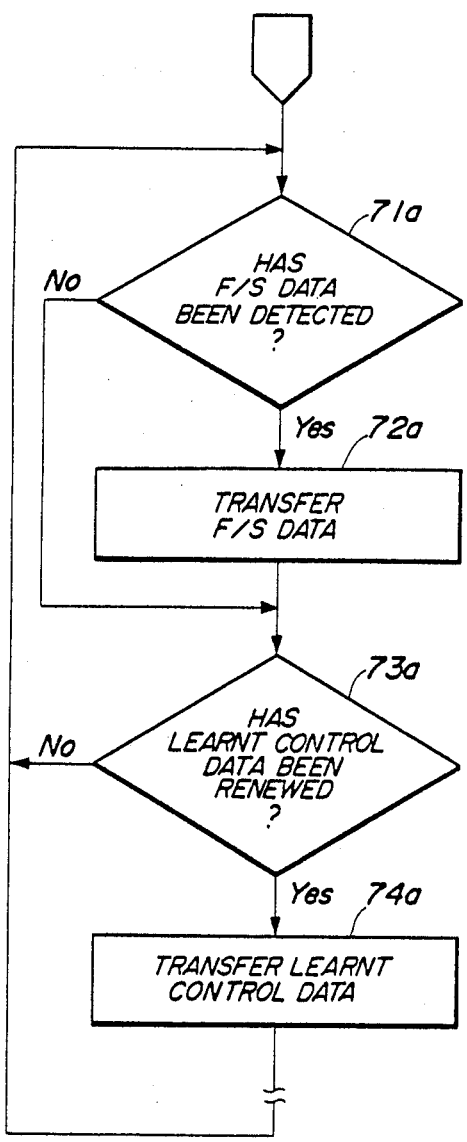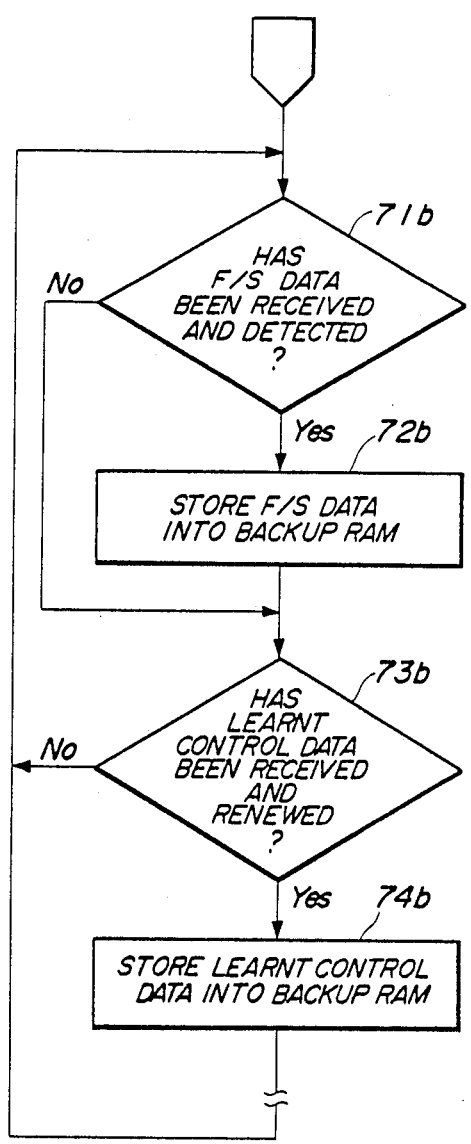
FIG. 11(a)
FIG. 11(b)

ELECTRONIC CONTROL SYSTEM FOR INTERNAL COMBUSTION ENGINES

BACKGROUND OF THE INVENTION

This invention relates to an electronic control system for internal combustion engines and, more particularly, to an electronic control system which has a plurality of central processing units for independently controlling at least two different engine operations.

A control system for electronically controlling such items as the amount of fuel injection and ignition timing of an internal combustion engine is already known, e.g. from Japanese Provisional Patent Application (Kokai) No. 53-76231, wherein the electronic control system is equipped with a single control processing unit (hereinafter referred to as a "CPU") supplied with input signals indicative of various engine operation parameters such as engine coolant temperature, absolute pressure in the engine intake pipe, a crank angle signal generated whenever the engine crankshaft rotates through a predetermined angular increment, and a reference position signal, two pulses of which are generated per revolution of the crankshaft. On the basis of these input signals, the CPU executes two separate sets of computations, one related to control of fuel injection quantity and the other related to control of ignition timing.

In recent years efforts have been made to meet the demand for improved drivability. This has resulted in more complex operational programs for each of quantities that are to be controlled, such as fuel injection quantity and quantity related to fuel injection timing, and, hence, in a heavier processing load upon the CPU. Consequently, when it is attempted to have a single CPU execute the processing needed to control a plurality of quantities such as fuel injection quantity and fuel injection timing, it is no longer possible to deal with an increase in processing load associated with each quantity. In particular, the demand for engine control of greater precision cannot be met by a single CPU at high engine rotation, where the time available for processing is less than that which can be used when the engine is rotating at low speed. Though this demand can in fact be satisfied if use is made of a CPU having a very high processing capability, such as a 32- or 64-bit CPU, this expedient is impractical because of the high cost involved.

On the other hand, if a plurality of CPU's are employed in order to simultaneously execute the processing needed to control a plurality of quantities such as fuel injection quantity and quantity related to fuel injection timing, each CPU has to be provided with one set of engine parameter sensors, an input circuit, etc. for inputting engine parameter values necessary for the control by the CPU. As a result, as many sets of such sensors, as many input circuits, etc. as the number of CPU's are required, which results in an electronic control system having a very complicated construction, making it difficult to perform assembling and maintenance.

In such an arrangment employing a plurality of CPU's to execute a plurality of controls, if in order for each CPU to execute respective control at proper timing, each CPU is supplied with a cylinder discriminating (CYL) signal, a TDC signal, and a crank angle position signal as aforementioned so that the CPU executes starting and stopping of counting, timing of sampling, etc. by the use of a respective operational program provided exclusively for the CPU, separately from the other CPU's, it requires the use of a set of operational programs for the CPU's, resulting in a further complicated construction of the electronic control system.

Also, in the arrangement employing a plurality of CPU's, a so-called failsafe operation is required in the event of occurrence of abnormality in input and output units associated with each CPU. Desirably, such failsafe operation should be executed based on so-called learnt control data prepared based on operation control data applied when the input and output devices are operating normally and stored in a non-volatile memory device.

However, if each CPU is provided with such a non-volatile memory device to store abnormality-determining data as well as learnt control data, it will result in still further complication of the electonic control system.

SUMMARY OF THE INVENTION

It is therefore a first object of the invention to provide an electronic control system for an internal combustion engine, which control system, without being complicated, is capable of executing with precision complicated processing needed to control a plurality of quantities such as fuel injection quantity and fuel injection timing.

It is a second object of the invention to provide an electronic control system for an internal combustion engine, wherein engine rotation parameters are detected at optimum timing with regard to the ignition timing and fuel injection quantity, to thereby improve the accuracy of operation control of the engine.

It is a third object of the invention to provide an electronic control system for an internal combustion engine, which control system, without being complicated, is capable of properly executing a failsafe operation when an abnormality occurs in any of the input and output devices and also of memorizing the location of occurrence of the abnormality, to thereby facilitate the maintenance operation.

According to the present invention, the above first object of the invention is attained by providing an electronic control system for an internal combustion engine, including fuel supply means for supplying fuel to the engine, and ignition means for igniting a mixure formed by fuel being supplied to the engine from the fuel supply means, which system is characterized by comprising in combination a first central processing unit connected with the fuel supply means for controlling the fuel supply to the engine through the fuel supply means, a second central processing unit connected with the ignition means for controlling the ignition of the mixture supplied to the engine through the ignition means, first sensing means connected to the first central processing unit for detecting at least one first operating parameter of the engine and supplying the detected value of the first operating parameter to the first central processing unit, second sensing means connected to the second central processing unit for detecting at least one second operating parameter of the engine and supplying the detected value of the second operating parameter of the engine to the second central processing unit, and signal transfer means connected between the first and second central processing units for transferring the detected values of the first and second operating parameters of the engine from one of the first and second central processing units to the other, and vice versa, wherein the first and second central processing units control, respectively, the fuel supply to the engine and the ignition of the mixture supplied to the engine, both in response to the detected values of the first and second operating parameters of the engine supplied thereto.

The first object of the invention may also be attained by providing an arrangement comprising in combination a first central processing unit connected with the fuel supply means for controlling the fuel quantity to be supplied to the engine through the fuel supply means, a second central processing unit connected with the ignition means for controlling the ignition timing of the mixture supplied to the engine through the ignition means, first sensing means connected to the first central processing unit for detecting at least one first operating parameter at least representative of load on the engine and supplying the detected value of the first operating parameter in the form of an analog quantity to the first central processing unit, and second sensing means connected to the second central processing unit for detecting predetermined crank angle positions of the engine and supplying a timing signal representative of each of the detected predetermined crank angle positions of the engine to the second central processing unit, and transfer line means connected between the first and second central processing units for delivering a trigger signal from the second central processing unit to the first central processing unit for causing the first central processing unit to start calculation of the fuel quantity to be supplied to the engine, wherein the second central processing unit is adapted to determine whether the first central processing unit should start the calculation of the fuel supply quantity, each time the second processing unit is supplied with the timing signal, and to send the trigger signal to the first central processing unit through the transfer line means to cause same to start the calculation, when it is determined that the calculation should be started.

The second object of the invention is attained by providing an electronic control system for an internal combustion engine, for controlling at least two operations of the engine, which system is characterized by comprising in combination a first central processing unit for controlling a first operation of the engine, a second central processing unit for controlling a second operation of the engine, first counter means connected to the first central processing unit for detecting a first parameter indicative of the rotational speed of the engine and supplying the detected value of the first parameter to the first central processing unit, and second counter means connected to the second central processing unit for detecting a second parameter indicative of the rotational speed of the engine, and supplying the detected value of the second operating parameter to the second central processing unit, wherein the operations of the first and second counter means are controlled by one of the first and second central processing units.

Further, the third object of the invention is attained by providing an electronic control system for an internal combustion engine, including fuel supply means for supplying fuel to the engine, and ignition means for igniting a mixure formed by fuel being supplied to the engine from said fuel supply means, which system is characterized by comprising in combination a first central processing unit connected with the fuel supply means for controlling the fuel supply to the engine through the fuel supply means, a second central processing unit connected with the ignition means for controlling the ignition of the mixture supplied to the engine through the ignition means, non-volatile read-write memory means connected to one of the first and second central processing units and storing first control data used by the first central processing unit for controlling the fuel supply to the engine and second control data used by the second central processing unit for controlling the ignition of the mixture supplied to the engine.

The above and other objects, features and advantages of the invention will be more apparent from the ensuing detailed description taken in conjunction with the accompanying drawings.

BRIEF DESCRIPTION OF THE DRAWINGS

FIGS. 11(a) and (b) are related portions of a program flowchart illustrating manners of transferring failsafe data and learnt control data from the second central processing unit to the first central processing unit.

DETAILED DESCRIPTION

The invention will now be described in detail with reference to the drawings.

Figure 1:
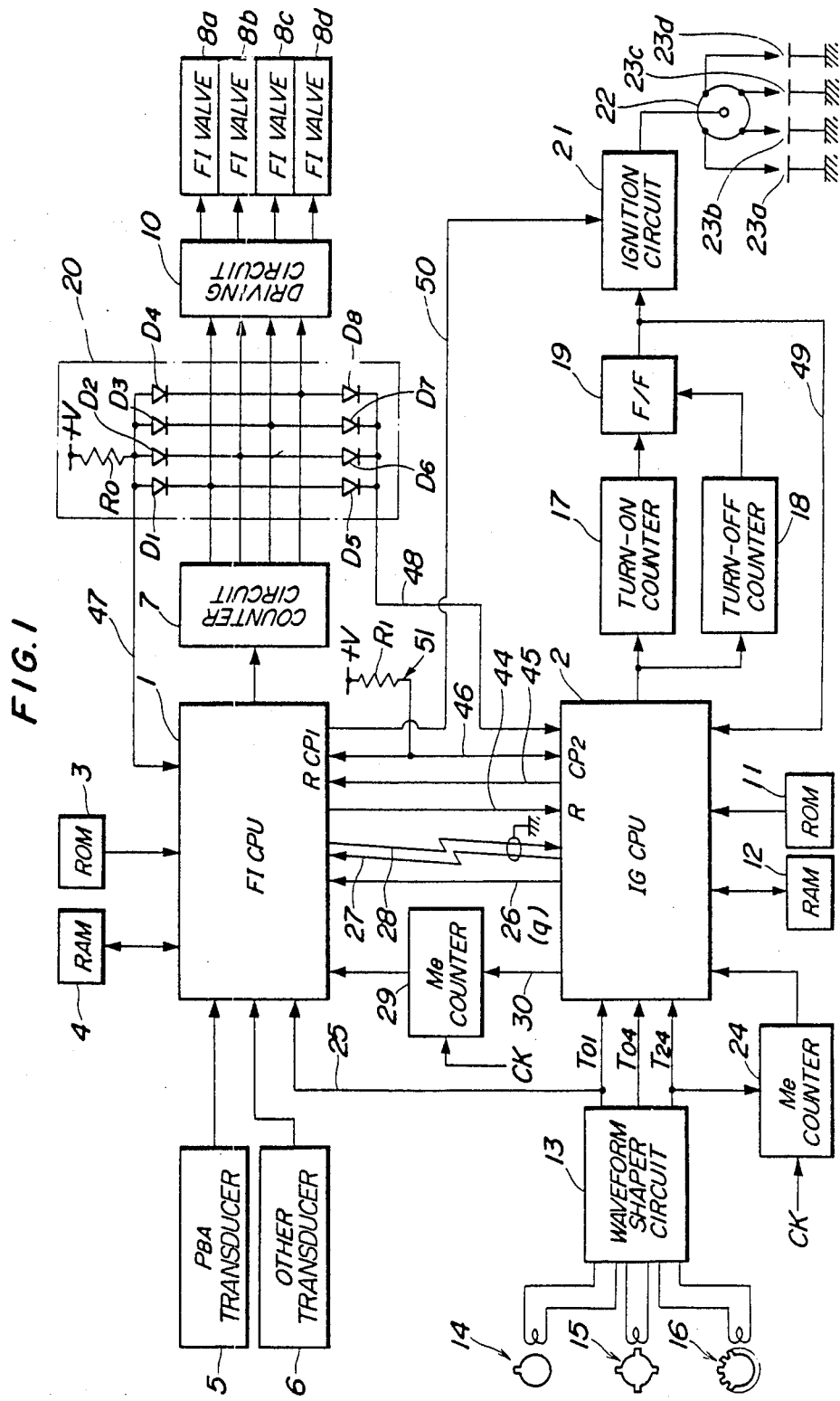
FIG. 1 is a block diagram illustrating an electronic control system for an internal combustion engine in accordance with the present invention.

Referring to FIG. 1, there is illustrated the whole arrangement of an electronic control system ECU for an internal combustion engine according to the present invention. Built in the electronic control system are two CPU's, i.e. a first CPU 1 dedicated to controlling the supply of fuel to an internal combustion engine and a second CPU 2 dedicated to controlling the timing at which a mixture formed by the supplied fuel is ignited inside the engine. Connected to the first CPU 1 are a read only memory (hereinafter called "ROM") 3 and a non-volatile random access memory (hereinafter called "RAM") 4 also serving as a backup RAM; the former stores various operational programs to be executed in the first CPU 1 and various tables to be used in calculating fuel injection quantity, i.e., valve opening period of fuel injection valves 8, and the latter temporarily stores the results of calculations performed by the first CPU 1. The RAM 4 is adapted and disposed to store results of claculations executed by the first CPU 1, as well as learnt control data and failsafe control data, both referred to later. Since the RAM 4 is of non-volatile type, the values stored in the RAM are not erased even after an ignition switch provided in a vehicle equipped with the engine is turned off, and the RAM is arranged to be backed up while the ignition switch is off.

Connected to the input side of the first CPU 1 are a PBA transducer 5 for sensing a value of absolute pressure PBA prevailing in the intake pipe (not shown) of the internal combustion engine and for converting this value into a digital value delivered to the first CPU 1, and a number of other transducers, indicated in FIG. 1 by a single block 6, for sensing the values of such engine operation parameters as intake air temperature TA, engine coolant temperature TW, throttle valve opening $\theta$TH, and exhaust gas $O_2$ concentration, and for convertint these values into digital values delivered to the first CPU 1. These transducers 5 and 6 constitute first sensing means. Connected to the output side of the first CPU 1 is a counter circuit 7 for counting, based on fuel ignition time data described below, the lengths of time fuel injection valves $8a14$ $8d$ are to be opened. The counter circuit 7 has output lines connected to the respective fuel injection valves $8a$–$8d$ via a wired OR circuit 20 and a driving circuit 10. It should be noted that the fuel injection valve $8a$–$8d$ are each provided for each cylinder of the engine. Accordingly, the counter circuit 7 is equipped with counters equal to the number of engine cylinders. The counter circuit 7, the fuel injection valves $8a$–$8d$, the driving circuit 10, etc. cooperate to constitute fuel supply means.

The wired OR circuit 20 is composed of diodes D1–D8, and a resistance R0. The diodes D1–D4 each have its anode terminal connected via the resistance R0 to a supply voltage source +V and also connected via a line 47 to the first CPU 1, while the diodes D5–D8 each have its cathode terminal connected to anode terminals of the respective diodes D1–D4 and also connected via a line 48 to the second CPU 2, the junctions between the cathodes of diodes D1–D4 and the anodes of respective diodes D5–D8 being connected to respective output terminals of the counter circuit 7 as well as to respective input terminals of the driving circuit 10. When each counter of the counter circuit 7 is operative, it generates a low level (L level) output through the corresponding output terminal of the circuit 7, and this L level output causes the driving circuit 10 to activate a corresponding one of the fuel injection valves $8a$–$8d$. Therefore, when each counter of the counter circuit 7 is operating normally, an L level signal is fed back through the line 47 to the first CPU 1, which is adapted to detect abnormality occurring in the counter circuit 7, depending upon the level of the signal fed back thereto through the line 47, in a manner described later.

The second CPU 2 is equipped with a ROM 11 and a RAM 12 The RAM 12 is of volatile type and values stored therein are erased when the ignition switch is turned off. Connected to the input side of the second CPU 2 is a waveform shaper circuit 13 the input side of which is connected to various sensors. These sensors include a cylinder discriminating (CYL) sensor 14 which, at a predetermined crank angle position of a specific cylinder of the engine, outputs a single pulse of a cylinder discriminating signal T01, a top dead center (TDC) sensor 15 which, at a predetermined crank angle position before top dead center (BTDC) of each cylinder, outputs a reference crank angle signal T04 whenever the engine crankshaft rotates through 180°, and a crank angle sensor 16 for outputting a single pulse of a crank angle signal T24 whenever the crank shaft rotates through 30°. These sensors 14, 15 and 16 constitute second detection means.

Connected to, output terminals of the second CPU 2 in parallel-connection are a turn-on counter 17 and a turn-off counter 18. The outputs from both of these counters 17, 18 are connected to a flip-flop circuit 19, whose output is applied to an ignition circuit 21. The output of the latter. is connected to a distributor 22. The distributor 22 is connected with spark plugs $23a$ through $23d$, each provided in respective cylinder. The distributor 22, and the spark plugs $23a$ through $23d$, constitute ignition means. Arranged in the ignition circuit 21 is a well-known ignition coil, not shown, comprising a primary coil and a secondary coil. The turn-on counter 17 and the turn-off counter 18 are both down counters. As will be described in detail below, conduction timing data calculated by the second CPU 2 are set in the turn-on counter 17, which is provided with clock pulses for counting down these data in a range of crank angle positions within which conduction of the primary coil is to start (which range shall hereafter be referred to simply as a "conduction stage"), with the downcount starting from the beginning of the particular stage. This is to regulate the conduction commencing timing of the primary coil of ignition circuit 21.

Likewise, ignition timing data calculated by the second CPU 2 are set in the turn-off counter 18, which is provided with clock pulses for counting down these data in a predetermined "ignition stage" from the beginning of this stage. This is to decide the timing at which conduction of the primary coil is to be terminated. Thus, the turn-on counter 17 and turn-off counter 18 in combination decide the turn-on timing and turn-off timing of the primary ncoil in ignition cirucit 21, whereby the secondary coil is made to generate a high voltage pulse for firing the spark plug 22. Through this cooperation of the turn-on counter 17 and the turn-off counter 18 the timing for turning-on as well as turning-off of the ignition circuit 21 are decided.

The input side of the ignition circuit 21 is connected via a line 50 to the first CPU 1 to be supplied with a control signal from the CPU 1 when abnormality occurs in the flip-flop circuit 19, etc., as described later.

The output side of the flip-flop circuit 19 is connected via a line 49 to the second CPU 2 to feed its output signal back to the CPU 2, which is adapted to detect abnormality occurring in the flip-flop circuit 19, depending upon the level of the signal fed back thereto through the line 49, in a manner described later.

A signal generator circuit 51 is formed by a resistance R1, one end of which is connected to the supply voltage source +V, and the other end to corresponding ports (hereinafter each called "check port") CP1, CP2 provided in the CPU's 1 and 2 via a common line 46.

The waveform shaper circuit 13 has a T24 transfer line connected to an Me counter 24, the output whereof is connected to the second CPU 2. The Me counter 24 is reset each time a pulse in the crank angle signal T24 from the waveform shaper circuit 13 is applied thereto and, hence, counts the time interval at which the pulses in the crank angle signal T24 are generated to store the counted value in a register, not shown. The second CPU 2 reads in this counted value and uses it to calculate a parameter value Me, which is proportional to the reciprocal of engine rpm Ne. The value Me, which serves as information indicative of engine rpm Ne, is used as a parameter in the calculation of ignition timing.

Various transfer lines interconnect the first and second CPU's 1 and 2. These include a transfer line 25 connected between the output side of the waveform shaper circuit 13 and the input side of the first CPU 1 for transfer of the cylinder discriminating (CYL) signal T01, a transfer line 26 connected between the input side of the first CPU 1 and the output side of the second CPU 2 for providing a trigger signal q from the latter to the former, in response to which the CPU 1 starts performing calculations. Also, transfer lines 27 and 28 are connected between the first CPU 1 and the second CPU 2, the line 28 being for transferring such data as engine parameters as well as a transfer instruction signal from the first CPU 1 to the second CPU 2, and the line 27 being for sending an acknowledgement signal from the second CPU 2 to the first CPU 1 confirming that the transfer instruction has been received. A parallel-to-serial conversion circuit is provided in the CPU 1 at the output end of the transfer line 28 and another in the CPU 2 at the output end of the transfer line 27. Also, a serial-to-parallel conversion circuit is provided in CPU 1 at the input end of the transfer line 27 and another in the CPU 2 at the input end of the transfer line 28. The paired conversion circuits at the both ends of each line 27, 28 are for transferring data in a serial manner, i.e., not in synchronism. The transfer lines 27, 28, the serial-to-parallel conversion circuits, the parallel-to-serial conversion circuits, etc. constitute signal transfer means.

Further connected between the first CPU 1 and the second CPU 2 are a transfer line 44 for delivering a reset signal from the first CPU 1 to the second CPU 2 to prohibit the CPU 2 from operating in the even of occurrence of abnormality in the control system, and a transfer line 45 for delivering a reset signal from the the second CPU 2 to the first CPU 1 to prohibit the CPU 1 from operating in the even of occurrence of abnormality as mentioned above.

Connected to the second CPU 2 is another Me counter 29 via a line 30 to be supplied with a start trigger signal from the CPU 2 therethrough. The output of Me counter 29 is connected to the first CPU 1. The start trigger signal is generated each time the second CPU 2 detects a particular crank angle position, e.g. 90 degrees BTDC. When supplied with each start trigger signal, the Me counter 29 has its counted value stored into a register, not shown, and at the same time the counted value is reset to zero, immediately followed by restarting the counting of clock pulses applied thereto. Thus, the counted value stored in the register represents the number of clock pulses generated between the immediately preceding start trigger signal nd the present one, in other words, the time interval of generation of start trigger signals. The registered counted value is read into the first CPU 1 to be used in calculation of a parameter value Me, which is a value proportionate to the reciprocal of the engine rotational speed Ne. The value Me is used as one of the parameters in the calculation of fuel injection quantity as information indicative of the engine rotational speed Ne.

Next, referring to FIG. 2, the constructions and operations of the parallel-to-serial conversion circuit and the serial-to-parallel conversion circuit provided at the ends of the transfer line 28 will now be explained. Since the constructions and operations of corresponding circuits at the ends of the transfer line 27 are identical with those provided at the line 28, the explanation thereof is omitted.

Figure 2:
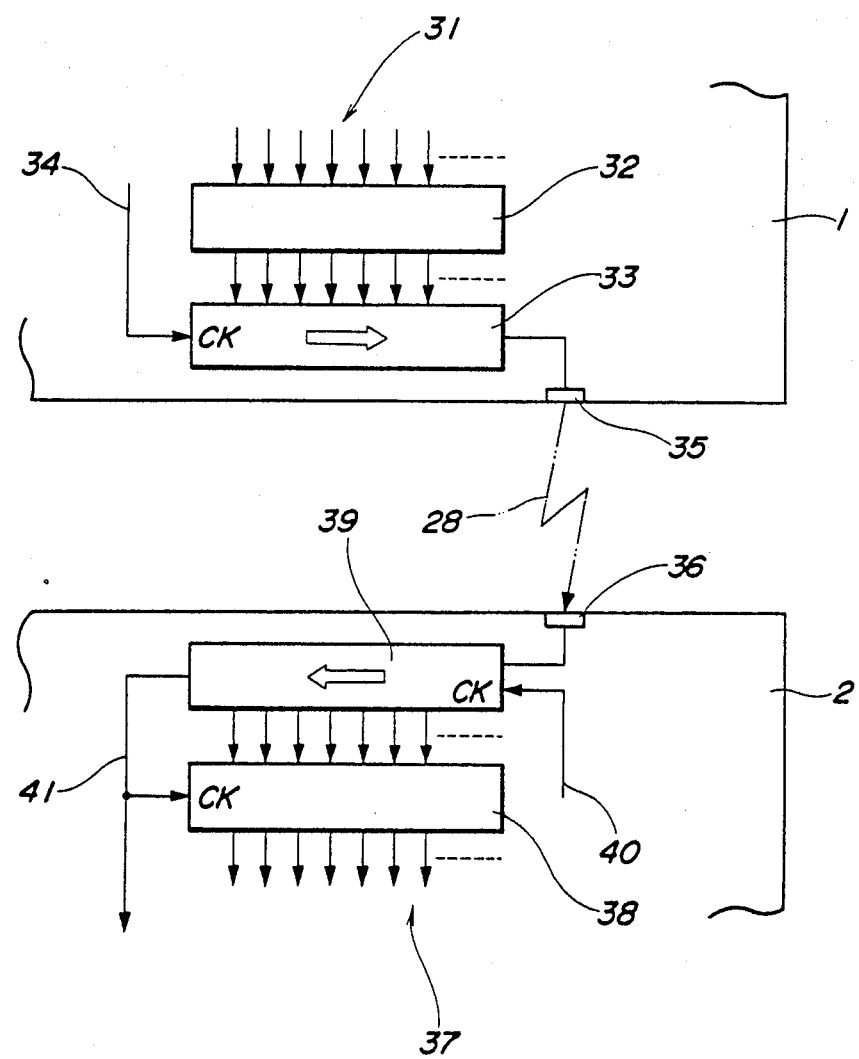
FIG. 2 is a block diagram illustrating a data transfer circuit comprising a latch circuit and a shift register, and adapted to transfer data between first and second central processing units in FIG. 1.
Figure 3:
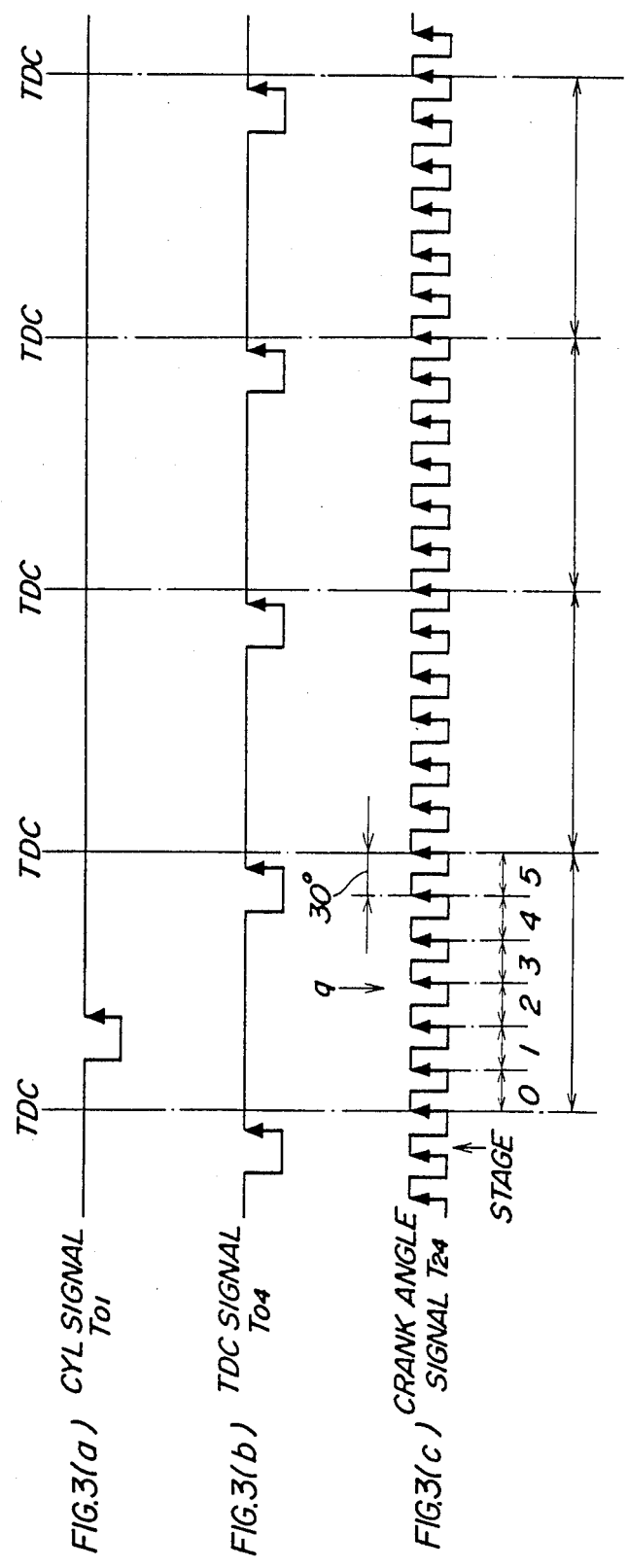
FIGS. 3(a) (b), and (c) are related portions of a timing chart illustrating the timing of generations of pulses such as of TDC signal and crank angle position signal.
Figure 4:
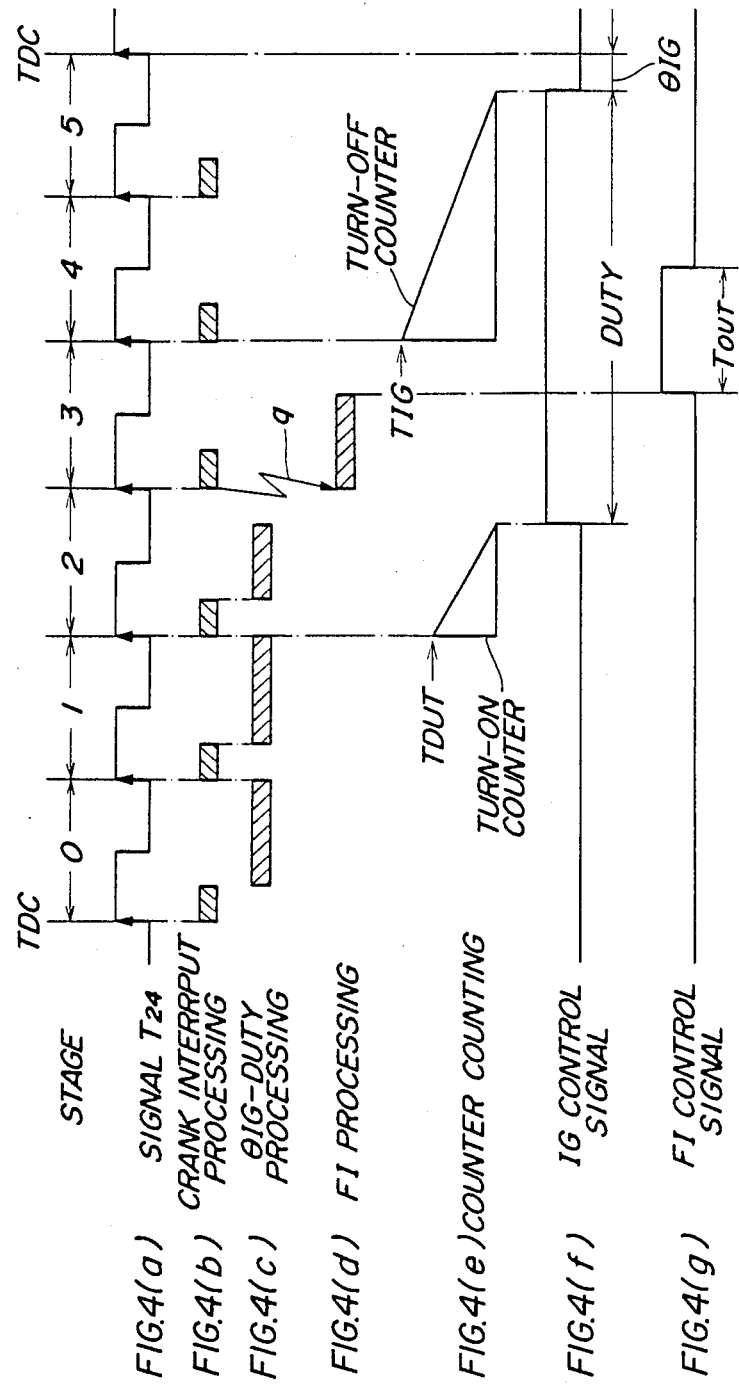
FIGS. 4(a), (b), (c), (d), (e), (f), and (g) are related portions of a timing chart illustrating the timing of commencement of conduction of the ignition coil and termination of same.
Figure 7:
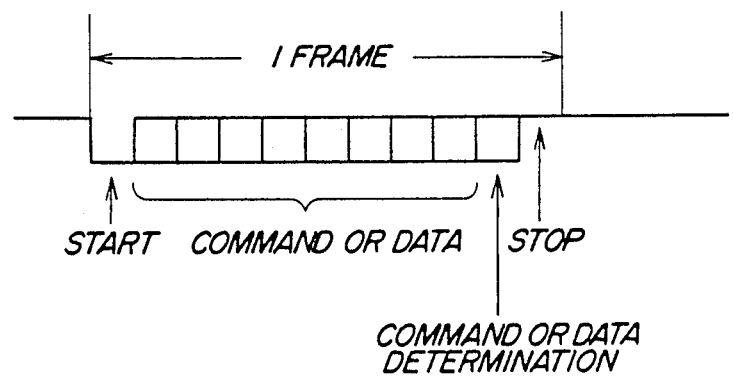
FIG. 7 is a block diagram illustrating the arrangement of one frame of data to be transferred.

In FIG. 2 reference numeral 31 designates the parallel-to-serial conversion circuit, which is composed of a latch circuit 32 adapted to latch eleven bits as one frame consisting of eight bits representing command or engine operation parameter data, one bit for determining whether they are command or data bits, and two bits for starting and stopping the transfer, respectively, (hereinafter called "start bit" and "stop bit", respectively) (FIG. 7), and a shift register 33 adapted to receive the eleven bit data in a parallel manner, i.e. at one time from the latch circuit 32 and transfer the input data in a serial manner by one bit each time a clock pulse is applied thereto through a transfer line 34. An output terminal of the shift register 33 is connected to an input terminal of a shift register 39 in the second CPU 2, via an output port 35, the transfer line 28 and an input port 36. This shift register 39 cooperates with a latch circuit 38 to constitute the serial-to-parallel conversion circuit 37, and is disposed to store the eleven bit data inputted thereto in a manner reverse to the operation of the parallel-to-serial conversion circuit 31.

In FIG. 2, reference numeral 40 designates a transfer line for inputting clock pulses to the shift register 39. Inputting of clock pulses to the register 39 through the input transfer line 40 is effected in asynchronism with inputting of clock pulses to the register 33 through the transfer line 34 but the two kinds of clock pulses have the same frequency.

When the transfer of eleven bit data has been finished, a signal corresponding to the stop bit of the data thus transferred, hereinafter referred to, is supplied from the register 39 through an output transfer line 41 to a clock input terminal of the latch circuit 38 to inform that a transfer of one frame of data has been completed. In the case of transferring two frame data continuously as described later, a signal corresponding to the stop bit of a first frame of data is supplied from the shift register 39 to the latch circuit 38 to inform that a transfer of the first frame of data has been completed, and a signal corresponding to the stop bit of a second frame of data to inform that a transfer of the second frame of data has been completed, respectively.

Now, the operation of the electronic control system constructed as above will now be explained with reference to FIGS. 3a through 7.

The ignition timing control is conducted by the second CPU 2, to which the CYL signal T01, the TDC signal T04, and the crank angle signal T24 are supplied from the respective sensors 14 through 16 after their waveforms have been shaped by the waveform shaper circuit 13 [FIGS. 3(a)–(c)]. Of these signals, the CYL signal T01 is also supplied to the first CPU 1 through the transfer line 25 as a signal for determination as to which of the engine cylinders fuel injection is to be effected into. The stages shown in FIGS. 3(a)–(c) and 4(a)-(g) refer to the time interval or spacing between the leading edge of each pulse of the crank angle signal T25 and the leading edge of the next pulse. These stages are numbered consecutively from 0 to 5 starting from the first stage.

The second CPU 2 executes two programs for controlling ignition timing. One is a crank interrupt processing program [FIG. 4(b)] executed whenever a pulse in the crank angle signal T24 is generated, and the other is a $\theta$IG-DUTY processing program [FIG. (c)] executed following the end of the crank interrupt processing program executed in stage 0. When a pulse in the crank angle signal T24 is inputted to the second CPU 2 during execution of the $\theta$IG-DUTY processing, execution of crank interrupt processing takes precedence.

In the crank interrupt processing, it is determined whether the present stage is a conduction stage at which the turn-on counter 17 is to start counting based on the TDC signal T04 and crank angle signal T24 (stage 2 in FIGS. 4(a)-(g), a predetermined stage at which the turn-off counter 18 is to start, counting based on the above signals (stage 4 in FIGS. 4(a)-(g), a predetermined stage at which the first CPU 1 is to start executing a fuel injection quantity control operation (FI operation), described later (stage 3 in FIGS. 4(a)-(g), etc. In particular, the second CPU 2 determines whether or not the present stage is the stage 3, and when it is so determined, the second CPU 2 supplies the first CPU 1 with a start trigger signal through the trigger signal line 26, whereby the FI operation is started by the first CPU 1. The second CPU 2 is also adapted to execute another crank interrupted handling operation to execute detection of the time interval ME6i at which the crank angle signal T24 is generated, and the starting of the turn-on and turn-off counters 17, 18, etc.

$\theta$IG-DUTY processing, on the other hand, involves computing such data as an advance angle control value $\theta$IG, a conduction control value DUTY (the ratio of coil conduction time to the TDC signal generation time interval), conduction timing TDUT and ignition timing TIG.

Let us describe the processing for each item of the above data in detail. The second CPU 2 calculates the advance angle control value $\theta$IG from such values as engine rpm Ne, intake pipe absolute pressure PBA and engine coolant temperature TW in accordance with the following equation (1):

$$\theta IG = \theta MAP + \theta IGCR \quad (1)$$

in Equation (1), $\theta$MAP represents a basic advance angle value read out of a map, which is stored in the ROM 11, from a location decided by the engine rpm Ne and intake pipe absolute pressure PBA. $\theta$IGCR represents the value of a variable for correcting the basic advance angle value. $\theta$IGCR is read out of a table stored in the ROM 11, from a location decided by the engine coolant temperature TW, intake air temperature TA and atmospheric pressure PB.

Engine rpm Ne used in calculating the value of $\theta$MAP is provided by the Me counter 24. The value Me employs a sum Me (=ME60+ME61+ME62+ME63+ME64+ME65) of values ME60-ME65 obtained by measuring the time intervals of respective stages 0-5 of the crank angle signal T24 shown in FIGS. 3(c) and 4(a) using clock pulses (fixed clock pulses) CK having a constant period.

The conduction control value DUTY is a function of engine rpm Ne and is read out of a table stored in the ROM 11 in a manner similar to that mentioned above. The value read out of the table is corrected by the battery voltage before being applied for use as the value DUTY.

Ignition is effected in a range of from 0° to 60° BTDC, namely in stage 4 or 5. More specifically, when the data applied to the turn-off counter 18 is counted down to zero by this counter which starts the countdown operation from the leading edge of stage 4, the current being fed into the primary coil of ignition circuit 21 is cut off. Assume that the input value applied to the turn-off counter 18 is TIG. This is a value obtained by an angle-to-time conversion and is found from the advance angle control value $\theta$IG and Me value obtained as described above. In addition, the conduction start timing TDUT is a value similarly obtained by an angle-to-time conversion and is decided by the advance angle control value $\theta$IG, conduction control value DUTY and the value Me. Thus, the values TIG and TDUT can each be set to any position within a stage. When an instant at which a particular stage starts (stage 2 in FIGS. 4(a) $\propto$ (g) in which conduction of the ignition coil is to start, the turn-on counter 17 starts counting down from a value corresponding to the value TDUT. Then, when the counted value in the counter 17 becomes 0, i.e. the set conduction starting time is reached, the flip-flop 19 is set to start conduction of the primary winding in the ignition circuit 21. As mentioned above, when the ignition timing TIG is attained in stage 4, the flip-flop 19 is reset by the output of the turn-off counter 18.

By being reset, the flip-flop circuit 19 provides the ignition circuit 21 with a signal for terminating conduction of the primary winding. At the instant the flow of current through the primary winding is thus halted, the secondary coil generates the high voltage for ignition to fire the spark plug 22 at the regulated advance angle position.

The first CPU 1 executes an FI (fuel injection) processing program for controlling fuel injection quantity. The first CPU 1 begins executing FI processing upon receiving the aforementioned trigger signal q outputted by the second CPU 2 at stage 3, namely when a crank angle position 90° BTDC is sensed by the crank angle sensor 16, in the crank interrupt processing process performed by the second CPU 2. The timing at which the trigger signal q is outputted is changed in accordance with engine operating conditions, such as engine speed Ne and intake pipe absolute pressure PBA, so that the injection timing is controlled thereby.

According to FI processing, the first CPU 1 reads in such data as the intake pipe absolute pressure PBA from the PBA transducer 5, the throttle valve opening signal 0TH and the detected value of $O_2$ concentration in the exhaust gases, reads in data indicative of Me counted by the Me counter 29, calculates fuel injection time TOUT in accordance with the following equation (2):

$$TOUT = Ti \times K1 + K2$$

and, at the same time that the calculation of TOUT ends, controls the start of the counter circuit 7, namely the counter for the predetermined engine cylinder into which fuel injection is to be effected.

In the above equation (2) for TOUT, Ti represents a basic fuel injection time during which the fuel injection valve 8 injects fuel. Ti is read out of the ROM 3 on the basis of, e.g., the intake pipe absolute pressure PBA and engine rpm Ne. K1 and K2 are correction coefficients and correction variables, respectively, calculated in dependence upon engine parameter signals from various parameter sensors such as the aforementioned sensors. K1 and K2 are calculated on the basis of predetermined arithmetic expressions in such a manner that such characteristics as the engine starting characteristic, emission characteristics, fuel consumption and engine acceleration characteristic are optimized in dependence upon the engine operating state. As described above, upon termination of calculation of the fuel injection period TOUT, the first CPU 1 sets a counter within the counter circuit 7 corresponding to the predetermined cylinder into which fuel is to be injected to the value corresponding to the calculated fuel injection period TOUT, and starts the set counter. The counter counts down from the set value and supplies the corresponding fuel injection valve 8 with a driving signal during the period of time the counter counts down from the initial value to 0, to thereby control the quantity of fuel to be supplied to the engine.

When the start trigger signal from the line 30, i.e. a timing signal for starting the counting, is inputted to the Me counter 29, the CPU 1 loads the counted value of the Me counter 29 into the RAM 4, and resets the counter to zero and causes same to resume counting. The Me counter 29 then counts the number of clock pulses inputted thereto from the time of generation of a pulse of the crank angle signal T24 at the present stage 3 to the time of generation of a signal T24 pulse at the next stage, that is, while the crankshaft rotates through 180 degrees. As stated before, the CPU 1 is responsive to the trigger signal q fron the second CPU 2 to read in the counted value Me from the Me counter 29 and calculates the engine rotational speed Ne.

The second CPU 2 has a function of deciding the timing of starting and stopping the operation of the Me counter 29. Further, the timing of calculation of the fuel injection period executed by the first CPU 1 can be set to any desired timing by adjusting the output timing of the trigger signal from the CPU 2. Therefore, the timing of starting the counting of the Me counter 29 can be set to a timing appropriate for the thus set calculation timing of the fuel injection period.

Further, according to the invention, the sampling timing of the counted value of the Me counter 29 can be set to any desired timing. For example, the Me counter 29 may count or measure the engine rpm Ne on the basis of pulses of the crank angle signal T24 generated at a particular crank angle position, and based upon the counted or measured value from the Me counter 29, the calculation of fuel injection period can be started at a predetermined crank angle position. In this way, the calculation timing and fuel injection timing can be freely and finely set.

Figure 5:
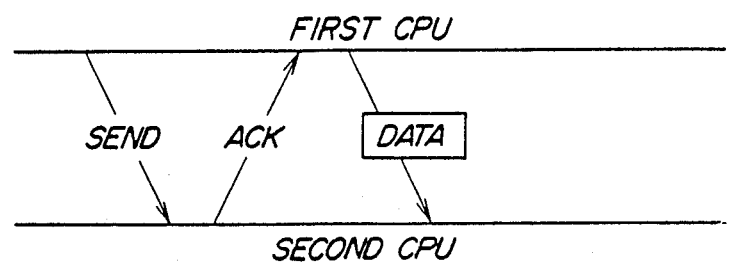
FIG. 5 is a timing chart illustrating the timing of transfer of one frame of data from the first central processing unit to the second central processing unit.
Figure 6:
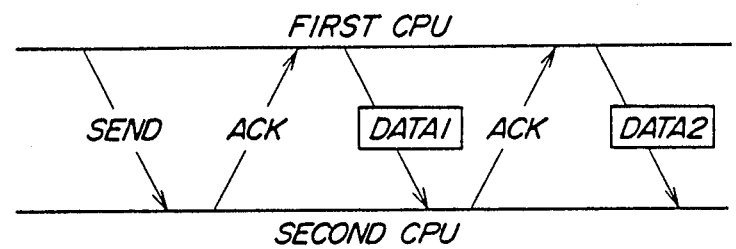
FIG. 6 is a timing chart illustrating the timing of transfer of two frames of data from the first central processing unit to the second central processing unit.

Let us now describe the manner of transfer of such data as engine operation parameters via the transfer lines 27, 28 for data transfer. The data transfer is effected in serial asynchronous manner when the first and second CPU's 1, 2 are free from such operations as crank interrupt processing operation and $\theta$IG-Duty calculation executed by the second CPU 2 and FI calculation executed by the first CPU 1 (this state is called "background"). First, when the first CPU 1 is in a background state wherein the FI calculation is not effected, the CPU 1 sends a transfer instruction signal SEND to the second CPU 2 via the transfer line 28 as shown in FIG. 5. When the second CPU 2 is in a background state wherein operations such as crank interrupt processing operation are not effected, that is, when the second CPU 2 is ready to receive data, it responds to the transfer instruction signal SEND from the first CPU 1 by sendind an acknowledgement signal ACK which indicates that the CPU 2 is ready to receive data from the CPU 1 via the transfer line 27. Responsive to the signal ACK, the first CPU 1 activates the shift register 33 with a clock pulse to output a start bit. Then, the shift register 33 outputs, one bit by one bit, data DATA, indicative of engine operation parameters, which have been parallelly loaded into the register from the latch circuit 32, each time a clock pulse is applied to the register, to thereby transfer the data DATA to the second CPU 2 via the transfer line 28. The shift register 39 in the second CPU 2 is loaded in serial manner with each bit of the transferred data DATA each time a clock pulse is applied to the register 39 through the line 40. At the time of a stop bit subsequent to the data DATA being inputted to the register 39, the latch circuit 38 is activated, into which 8 bits of the data DATA are latched at one time from the shift register 39. The data DATA latched into the latch circuit 38 is written into the RAM 12 by the second CPU 2 in its writing operation. The second CPU 2 is also adapted to send a request instruction signal to the first CPU 1 for requesting the first CPU 1 to transfer data thereto. In the same manner as stated above, the latest values of engine operation parameters are read into the RAM 12 connected with the second CPU 2 as well as the RAM 4 connected with the first CPU 1. When two frames of data are to be continuously transferred from the first CPU 1 to the second CPU 2, the second CPU 2, after receiving a first frame of data DATA1, sends the acknowledgement signal ACK to the first CPU 1, and then receives a subsequent frame of data DATA2. When an interrupt instruction enters one of the CPU's during the data transfer operation, no clock pulse is inputted to the corresponding shift register 33 or 39, to thereby halt the data transfer and effect the interrupt operation with priority to the data transfer. After the interrupt operation has been completed, the data transfer is resumed.

The fuel supply control applicable to the system according to the invention may include control for either the fuel injection quantity or the injection timing. Also, the ignition control applicable to the system of the invention may include control for either ignition timing or the conduction period.

As described above, according to the electronic control system of the invention, first sensing means for sensing first operating parameters of the engine is connected to the first CPU 1, and second sensing means for sensing second operating parameters of the engine to the second CPU 2, respectively, and signal transfer means are connected between the two CPU's for transferring the detected values of the first and second engine operating parameters from one of the CPU's to the other, and vice versa, wherein the first and second CPU's control, respectively, the fuel supply to the engine and the ignition of the mixture supplied to the engine, both in response to the detected values of the first and second engine operating parameters supplied thereto. Therefore, each CPU has only to execute calculation operations necessary for its respective control alone, to thereby enable the electronic control device to process an increased amount of operations or shorten the whole processing time. As a result, accurate and complicated control can be achieved even in a high speed region of the engine wherein a shorter time period is allowed for calculations, without employing an expensive and high performance CPU having higher calculation capabilities. Besides, the input circuits for inputting engine operation parameters including the waveform shaper circuit 13 can be commonly used by the two CPU's, to thereby enable simplifying the construction of the control system and facilitate the maintenance operation.

Further, the first sensing means supplies the first CPU 1 with detected values of first operating parameters at least reprsentative of load on the engine in the form of analog quantities, and the second sensing means supplies the second CPU 2 with timing signal data representative of predetermined crank angle positions of the engine. Signal line means is connected between the first and second CPU's for delivering a trigger signal from the second CPU 2 to the first CPU 1. The second CPU 2 is adapted to determine whether it should start calculation of the fuel injection quantity, each time the second CPU is supplied with the timing signal, and to send the trigger signal to the first CPU 1 through the signal line means to cause same to start calculation when it is determined that the calculation should start. By virtue of the above arrangement, data lines between the two CPU's can be reduced to a minimum number, enabling an increased amount of program processing to be executed.

Furthermore, according to the invention, first counter means 29 is connected to the first CPU 1 for detecting a first parameter indicative of the engine rotation and supplying same to the first CPU, and second counter means 24 connected to the second CPU 2 for detecting a second parameter indicative of the engine rotation and supplying same to the second CPU 2, wherein the operations of the first and second counter means are controlled by one of the first and second CPU's. By virtue of this arrangement, it is feasible to determine the engine rotation parameters at optimal timing to thereby enhance the precision of operation control of the engine.

Still further, according to the invention second CPU 2 includes means responsive to a timing signal T24 generated at a particular one of predetermined crank angle positions, for sending trigger signal to engine rotational speed sensing means connected to the first CPU to cause same to start detecting the rotational speed of the engine to thereby enable executing calculations in controlling a plurality of operations, e.g. the fuel injection quantity and the ignition timing in a parallel manner or at the same time by means of the two CPU's and accordingly enable each of the CPU's to execute an increased amount of calculation in controlling each of a plurality of operations.

Figure 8:
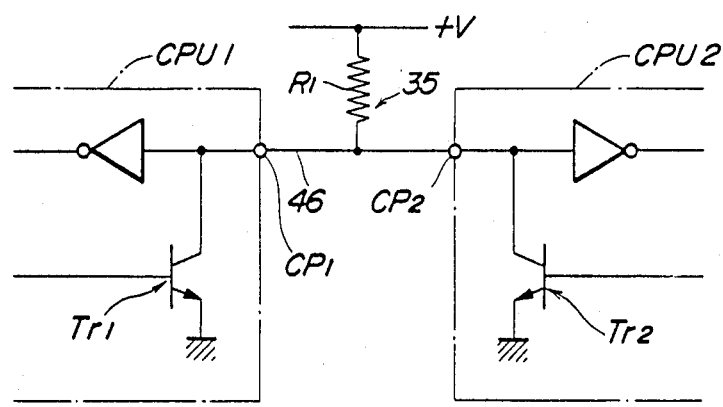
FIG. 8 is a circuit diagram illustrating an example of an equivalent circuit useful in explaining the relationship between a signal generator circuit and the corresponding CPU appearing in FIG. 1.

Next, how to detect abnormality in the electronic control system of the invention will now be explained, beginning with an explanation of the relationship between the CPU 1 and CPU 2 and the signal generating circuit 35. FIG. 8 shows an example of an equivalent circuit comprising CPU 1, CPU 2, and signal generating circuit 35 depicted hardware-wise, wherein if neither CPU 1 nor CPU 2 detects abnormality in the counter circuit 7 or the flip-flop circuit 19 which are connected to the output sides of the respective CPU 1 and CPU 2, the check ports CP1 and CP2 are set to an input mode position wherein the transistors Tr1 and Tr2 connected, respectively, to the check ports CP1 and CP2 are both disconnected, to thereby cause the check ports CP1 and CP2 to assume high (H) level potential.

When the CPU 1 detects abnormality in the counter circuit 7, as explained later, the check port CP1 is switched to an output mode position, to thereby cause the transistor Tr1 to conduct. As a result, the potentials of both the check ports CP1 and CP2 are changed to high level from low level. On the other hand, if the CPU 2 does not detect an abnormality in the flip-flop circuit 19, the check port CP2 is held in the input mode position. In other words, when neither CPU 1 nor CPU 2 detects an abnormality (i.e., when both the circuits 7, 19 are in normal state), CPU 1 and CPU 2 should detect the potentials of the check ports CP1 and CP2 in input mode to assume high level, and on the other hand, when either one of the CPU's detects an abnormality, its check port is switched to the output mode and outputs low level signal while the check port of the other (normal) CPU continues to be in the input mode. On this occasion the potential of the check port of the normal CPU in the input mode turns to assume high level from low level while the check port remains in the input mode, and then the normal CPU judges that there has occurred an abnormality in the other CPU, and outputs a reset signal to the other or abnormal CPU to thereby reset the operation of the abnormal CPU and at the same time executes a substitutive operation which the abnormal CPU should do if it is normal, on behalf of the abnormal CPU.

The CPU 1 detects abnormality in the counter circuit 7 in the following manner. When the CPU 1 supplies the counter circuit 7 with data of the fuel injection period TOUT, the output from the CPU 1 goes low in level. The output of the counter circuit 7 turns to low level at the time the CPU 1 sets the TOUT value, and is held at the low level while the couter is operating. When the output of the counter circuit 7 thus goes low, the signal level of the line 47 goes low accordingly, and is returned, i.e. fed back to the CPU 1. The CPU 1 compares between the output level from itself and the signal level of the line 47 fed back thereto to determine whether or not the counter circuit 7 is normal based on the comparison result.

When the output level from the counter circuit 7 is high even when the low level output is supplied to the counter circuit 7 due to abnormality in the latter, the CPU 1 judges from the high level signal through the line 47, that there has occurred an abnormality in the counter circuit 7. Also, if the low level signal fed back from the counter circuit 7 to the CPU 1 remains low even after the lapse of a predetermined period of time, the CPU 1 determines that an abnormality exists in the counter circuit 7.

Similarly, the CPU 2 detects abnormality in the flip-flop circuit 19 based on the level of the signal fed back from the flip-flop circuit 19 to the CPU 2 via the line 49, in a like manner.

Figure 9:
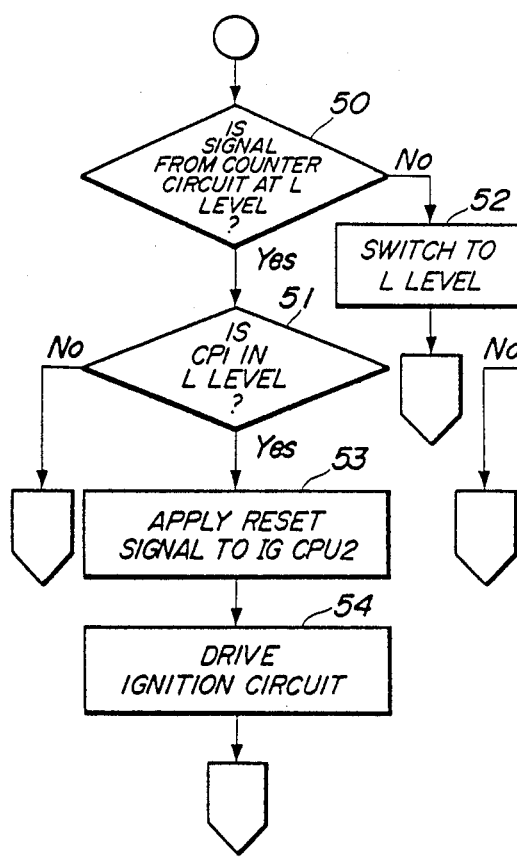
FIG. 9 is a program flowchart illustrating a manner of abnormality detection and substitutive processing to be executed by the first central processing unit upon occurrence of abnormality.
Figure 10:
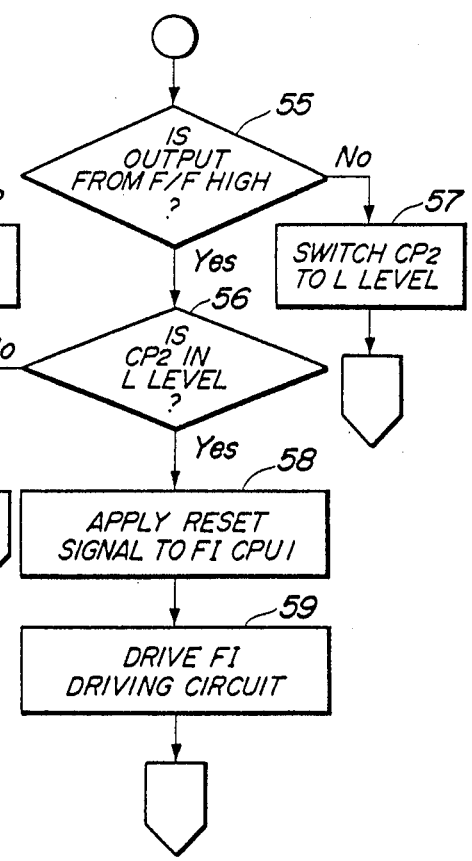
FIG. 10 is a program flowchart similar to FIG. 9, involving substitutive processing to be executed by the second central processing unit.

Referring next to FIGS. 9 and 10, the failsafe control executed upon abnormality occurrence will now be explained:

First, let us suppose that the check ports CP1 and CP2 of the CPU 1 and CPU 2 are both in input mode and assume high level potentials. When fuel injection period TOUT data has been set into the counter circuit 7, it is determined at step 50 whether or not the output from the counter circuit 7 turns to low level, that is, the low level signal is fed back to the CPU 1 from the circuit 7. If the answer is affirmative (Yes), it is then determined at step 51 whether or not the check port CP1 of the CPU 1 assumes low level potential. If the answer is negative (No), that is, if the signal outputted by the counter circuit 7 is not at low level even when the TOUT value is set into the counter 7, the counter circuit 7 is determined to be abnormal, whereupon the check port CP1 is switched from the input mode to the output mode, so that the potential level of the check port CP1 is turned to low level (step 52) and then the program terminates.

If the answer to the question of step 51 is negative (No), that is, if the check port CP1 of the CPU 1 provides high potential level and remains in the input mode, the CPU 1 judges that the control system of the CPU 2 including the ignition circuit 21 is in a normal state, whereupon the program terminates. If the answer to the question of step 51 is affirmative (Yes), that is, if, as described later, the CPU 2 detecting an abnormality in the ignition circuit 21 turns the check port CP2 into the output mode and accordingly its potential level becomes low, then the potential level of the check port CP1 of the CPU 1 which is in the input mode is correspondingly turned from high to low, whereby the CPU 1 decides that abnormality has occurred on the side of CPU 2. Then, the CPU 1 supplies a reset signal to the CPU 2 via the line 44, to thereby inhibit the operation of the CPU 2 (step 53), and the program proceeds to step 54.

At step 54, the CPU 1 switches the ignition timing control to a backup mode. That is, the CPU 1 supplies, via the line 50, the ignition circuit 21 with a control signal based on the learnt control data stored in the back up RAM 4 to thereby drive the ignition circuit 21. In this way, even when the flip-flop circuit 19 malfunctions and is hence prevented from operating, the CPU 1 takes over the ignition timing control to continue the engine operation.

On the other hand, the CPU 2 determines whether or not an output signal has been fed back from the flip-flop circuit 19 via the line 49 (step 55), and if the answer is affirmative (Yes), it is then determined whether or not the check port CP2 of the CPU 2 is at low level (step 56), and if the answer to the question of step 55 is negative (No), that is, if a high level signal has not been outputted by the flip-flop circuit 19 even when data of conduction timing TIG was set into the turn-off counter 18, then the flip-flop circuit 19 is determined to be abnormal, whereupon the check port CP2 is switched from input mode to output mode to turn the check port potential from high to low (step 57), and the program is terminated.

If the answer to the question of step 56 is negative (No), that is, if the check port CP2 of the CPU 2 provides high potential level and remains in output mode, the CPU 2 judges that the counter circuit 7 is in a normal state, whereupon the program terminates. If the answer to the question of step 56 is affirmative (Yes), that is, if the CPU 1 detects an abnormality in the counter circuit 7, the CPU 1 turns the check port CP1 into the output mode and accordingly its postential levle becomes low, then the potential level of the check port CP2 of the CPU 2 which is in the input mode is correspondingly turned from high to low, whereby the CPU 2 decides that abnormality has occurred on the side of CPU 1. Then, the CPU 2 supplies a reset signal to the CPU 1 via the line 45, to thereby inhibit the operation of the CPU 1 (step 58), and the program porceeds to step 59.

At the step 59, the CPU 2 switches the fuel injection control to the backup mode. That is, the CPU 2 maintains the signal level on the line 48 connecting between the CPU 2 and the wired OR circuit 20 to be low throughout the fuel injection period which is set based on the learnt control data, described later, each time a CYL signal T01 is generated. As a result, all the fuel injection valves 8a through 8d are opened at the same time, whereupon simultaneous injection takes place. Consequently, even when the counter circuit 7 malfunctions and is hence prevented from operating, the CPU 2 takes over the fuel injection control (simultaneous injection) to continue the engine operation.

Referring next to FIGS. 11(a)–(b) and 12(a)–(b), the manners of transferring the failsafe (F/S) data indicative of abnormality in the input/output devices of the first and second CPU's 1, 2 and the learnt control data between the first CPU 1 and the second CPU 2.

The manners of transferring the data from the second CPU 2 to the first CPU 1 is shown in FIGS. 11(a) and (b), flowcharts of the programs to be executed by the second CPU 2 and the first CPU 1, respectively.

First, it is determined whether or not the second CPU 2 has detected failsafe data regarding its input/output devices (step 71a). The failsafe data are such data that indicate occurrence of an abnormality in any of the input/output devices of the CPU (e.g. in the ignition circuit 21) when an abnormality actually occurs there, and also indicate the location of the abnormality (in the above example the ignition circuit 21). If the answer to the question of step 71a is affirmative (Yes), that is, if the CPU 2 detects the failsafe data the CPU 2 transfers the failsafe data to the CPU 1 via the transfer line 27 (step 72a). Thereupon, the failsafe data is stored into the backup RAM 4 at steps 71b and 72b of the program executed by the CPU 1, as described later.

On the other hand, if the answer to the question at step 71a is negative (No), the program proceeds to step 73a, where it is determined whether or not the learnt control data has been renewed. The learnt control data is a value determined based on such values as advance angle control value $\theta IG$, which is calculated by the CPU 2 while the input/output devices of the CPU 2 are operating normally, and in this embodiment the learnt control data is a mean value of values of $\theta IGIDL$ which is the advance angle control value while the engine is operating in a predetermined idle region. Therefore, while the engine is operating in the predetermining idle region, the learnt control data is renewed each time the TDC signal T04 is generated. If the answer to the question at step 73a is affirmative (Yes), that is, if the learnt control data has been renewed, then the renewed learnt control data is transmitted to the first CPU 1 via the line 27 (step 74a). The learnt control data is stored into the backup RAM 4 at steps 73b and 74b of the program executed by the CPU 1, as described later. If the answer to the question of step 73a is negative (No), the program skips step 74a and returns to step 71a.

Meanwhile, in the first CPU 1, it is determined whether or not the CPU 1 has received and detected the failsafe data transferred by the CPU 2 at step 72a and/or the failsafe data regarding the input/output devices of the CPU 1 (step 71b), and if the answer is affirmative (Yes) the detected failsafe data is stored into the backup RAM 4 (step 72b).

If, on the other hand, the answer to the question of step 71b is negative (No), the program proceeds to 73b, where it is determined whether or not the CPU 1 has received and detected the learnt control data supplied by the CPU 2 at step 74a and/or the learnt control data to be used in calculation by the CPU 1. Incidentally, in the CPU 1, a mean value of values of TOUTIDL, which represents a value of the fuel injection period while the engine is operating in a predetermined idle region, is employed as the learnt control data. If the answer to the question of step 73b is affirmative (Yes), that is, if the learnt control data has been received and renewed, then the learnt control data is stored into the backup RAM 4 (step 74b), and the program returns to step 71b, whereas if negative (No), the program directly returns to step 71b.

Figure 12A:
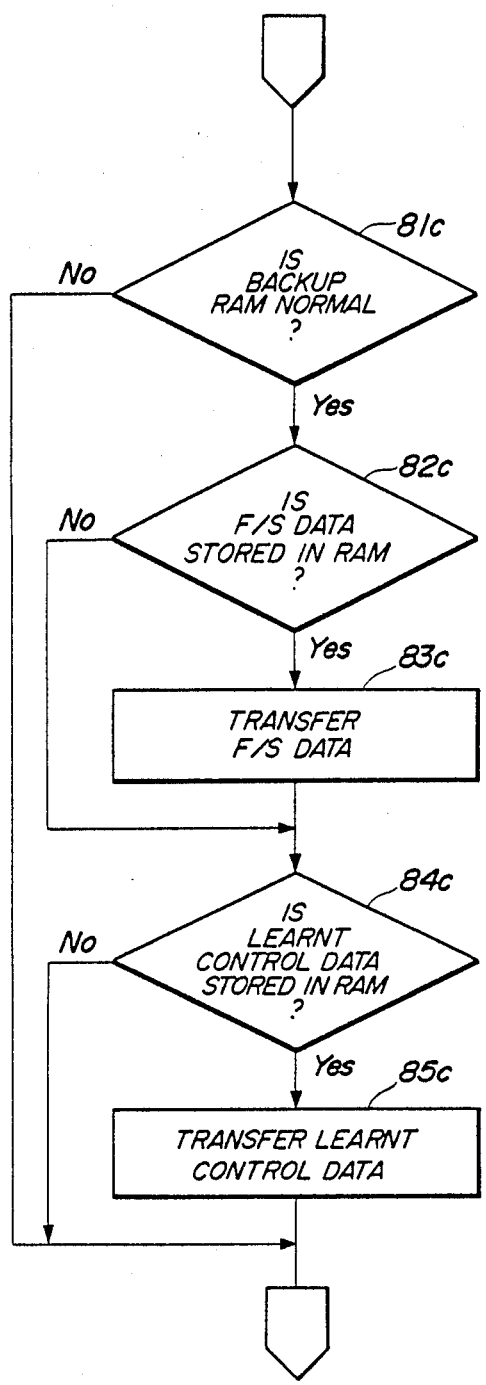
FIGS. 12(a) and (b) are related portions of a program flowchart illustrating manners of transferring failsafe data and learnt control data from the first central processing unit to the second central processing unit.
Figure 12B:
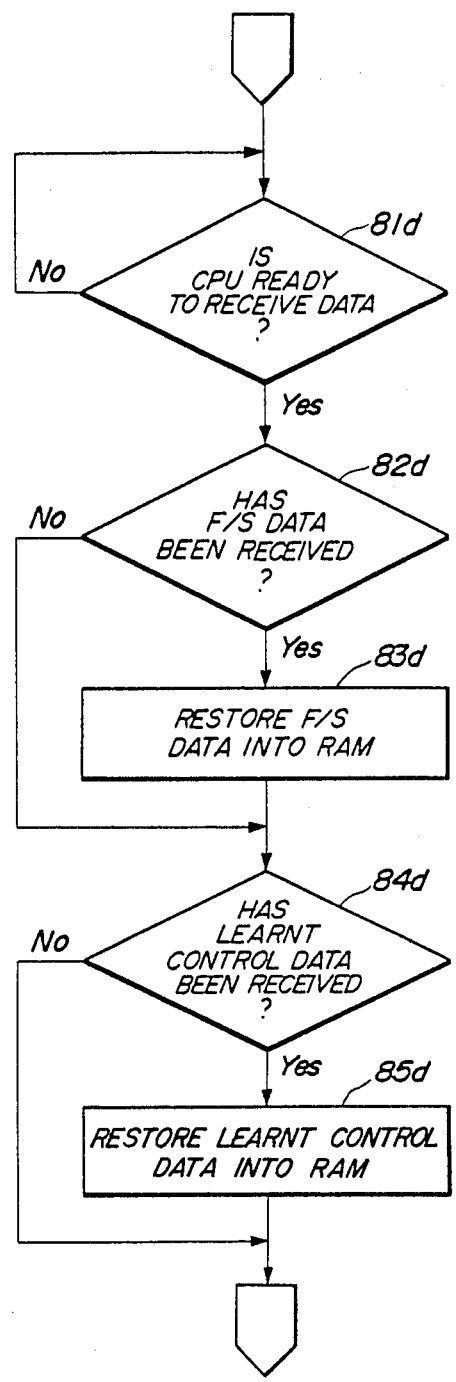

The manners of transferring the failsafe data and the learnt control data stored into the backup RAM 4 from the first CPU 1 to the second CPU 2 are shown in FIGS. 12(a) and (b), flowcharts of the programs to be executed by the CPU 1 and the CPU 2, respectively. These programs are executed when the engine is started again shortly after being stopped.

First, it is determined whether or not the backup RAM 4 is normal (step 81c). This determination is made as to whether or not the backup power source for the backup RAM 4 supplies a normal voltage which may be detected through reading the state of a sensor such as a flip-flop, not shown, which is disposed to sense and memorizes a drop in the supply voltage for the backup RAM 4. If the answer to the question of step 81c is affirmative (Yes), that is, if the backup RAM 4 is operating normally, the program proceeds to step 82c, where it is determined whether or not the aforementioned failsafe data is stored in the backup RAM 4. If the answer to the question of step 82c is affirmative (Yes), then the stored failsafe data is transferred to the CPU 2 via the transfer line 27 (step 83c), and the program proceeds to step 84c. On the other hand, if the answer to the question of step 82c is negative (No), the program jumps to step 84c.

Next, at step 84c it is determined whether or not the aforementioned learnt control data is stored in the backup RAM 4, and if affirmative (Yes), the stored learnt control data is transferred to the CPU 2 via the transfer line 27 (step 85c), and the program is terminated. If the answer to the question of step 84c is negative (No), the program is terminated, too.

If the answer to the question of step 81c is negative (No), that is, if the backup RAM 4 is not operating normally, the program is terminated.

Next, in the second CPU 2, it is first determined whether or not the CPU 2 is ready to receive the data from the CPU 1 (step 81d). In other words, it is determined whether or not the processing of the initialization routine by the CPU 2 has been completed upon turning-on of the power for restart of the engine. If the answer to the question at step 81d is affirmative (Yes), the program proceeds to step 82d, and if negative (No), the program is suspended until the CPU 2 is initialized.

At step 82d it is determined whether or not the failsafe data which is outputted by the first CPU 1 at step 83c has been received, and if affirmative (Yes) the received failsafe data is stored into the volatile RAM 12 provided in the CPU 2, that is, the failsafe data which was stored at the preceding engine operation but disappeared at the engine stop is restored into the RAM 12 (step 83d), and then the program directly proceeds to step 84d. On the other hand, if the answer to the question of step 82d is negative (No) the program jumps to step 84d.

Next, at step 84d it is determined whether or not the leant control data which is outputted by the first CPU 1 at step 85c has been received, and if affirmative (Yes), the received learnt control data is stored into the RAM 12, i.e. restored therein (85d), and the program is terminated. If, on the other hand, the answer to the question of step 84d is negative (No), the program is terminated, skipping step 85d.

Although in the foregoing embodiment the CPU's not only detect abnormality in output devices connected to the output side of the CPU's such as the counter circuit and the flip-flop circuit, but also execute substitutive operations on behalf of abnormal CPU upon detection of abnormality in the output devices, it is to be understood that the invention is not limited to the embodiment but the system accoring to the invention can be arranged such that the CPU's detect abnormality in input devices connected ot the input side of the CPU's such as the analog-digital converter for the PBA transducer 7 and also execute substitutive operations on behalf of abnormal CPU upon detection of abnormality detection in the input devices.

Also, it is possible to employ a binary LED to indicate the location of abnormality in the input/output devices of the CPU's, based on the aforementioned failsafe data.

As set forth above, according to the electronic control system of the invention, a read-write backup memory RAM 4 is connected to one of the first CPU 1 for controlling fuel injection quantity and the second CPU 2 for controlling ignition timing, and stores first and second control data used, respectively, by the first and second CPU's for performing the above control. Therefore, abnormality data, learnt control data, etc. can be stored in a single memory for use in control to be executed by the two CPU's thereby making it possible to simplify the construction of the failsafe control system, and accordingly that of the electronic control system as well as facilitate the maintenance. Furthermore, since in the embodiment state above the backup RAM 4 is connected to the first CPU 1 which is supplied with analog data required for fuel injection quantity (e.g. intake pipe absolute pressure, and engine coolant temperature), the backup RAM can be used to store substitutive values of data that are needed in the event of abnormality occurrence, i.e. the analog data.

What is claimed is:

1. In an electronic control system for an internal combustion engine, including fuel supply means for supplying fuel to the engine, and ignition means for ignition a mixture formed by fuel being supplied to the engine from said fuel supply means, the combination comprising a first central processing unit connected with said fuel supply means for controlling the fuel supply to the engine through said fuel supply means, a second central processing unit connected with said ignition means for controlling the ignition of the mixture supplied to the engine through said ignition means, read-write memory means with a backup power source connected to only one of said first and second central processing units and storing first control data used by said first central processing unit for controlling the fuel supply to the engine and second control data used by said second central processing unit for controlling the ignition of the mixture supplied to the engine.

2. An electronic control system as claimed in claim 1, including first sensing means connected to said first central processing unit for detecting a first operating parameter of the engine and supplying the detected value of said first operating parameter in the form of an analog quantity to said first central processing unit, and second sensing means connected to said second central processing unit for detecting at least a second operating parameter of the engine representative of predetermined crank angle positions of the engine and supplying the detected value of said second operating parameter to said second central processing unit, wherein said backup read-write memory means is connected to said first central processing unit, said first control data being adapted to control the fuel supply to the engine by using said first operating parameter.

3. In an electronic control system for an internal combustion engine, for controlling at least two operations of the engine, the combination comprising a first central processing unit for controlling a first operation of the engine, a second central processing unit for controlling a second operation of the engine, first counter means connected to said first central processing unit for detecting a first parameter indicative of the rotational speed of the engine and supplying the detected value of the first parameter to said first central processing unit, and second counter means connected to said second central processing unit for detecting a second parameter indicative of the rotational speed of the engine, and supplying the detected value of said second operating parameter to said second central processing unit, wherein the operations of said first and second counter means are controlled by one of said first and second central processing units.

4. An electronic control system as claimed in claim 3, wherein said one of said first and second central processing units is adapted to control a timing at which at least one of said first and second counter means starts a counting operation.

5. An electronic control system as claimed in claim 3, wherein said one of said first and second central processing units is adapted to control a timing at which a counted value obtained by at least one of said first and second counter means is sampled.

6. In an electronic control system for an internal combustion engine, including fuel supply means for supplying fuel to the engine, and ignition means for igniting a mixure formed by fuel being supplied to the engine from said fuel supply means, the combination comprising a first central processing unit connected with said fuel supply means for controlling the fuel quantity to be supplied to the engine through said fuel supply means, a second central processing unit connected with said ignition means for controlling the ignition timing of the mixture supplied to the engine through said ignition means, first sensing means connected to said first central processing unit for detecting at least one first operating parameter at least representative of load on the engine and supplying the detected value of said first operating parameter in the form of an analog quantity to said first central processing unit, and second sensing means connected to said second central processing unit for detecting predetermined crank angle positions of the engine and supplying a timing signal representative of each of the detected predetermined crank angle positions of the engine to said second central processing unit, and transfer line means connected between said first and second central processing units for delivering a trigger signal from said second central processing unit to said first central processing unit for causing said first central processing unit to start calculation of the fuel quantity to be supplied to the engine, wherein said second central processing unit is adapted to determine whether said first central processing unit should start said calculation of the fuel supply quantity, each time said second processing unit is supplied with said timing signal, and to send said trigger signal to said first central processing unit through said transfer line means to cause same to start said calculation, when it is determined that said calculation should be started.

7. An electronic control system as claimed in claim 6, including third sensing means connected to said first central processing unit for detecting the rotational speed of the engine and supplying the detected value of the engine rotational speed to said first central processing unit, wherein said second central processing unit includes means responsive to said timing signal generated at a particular one of said predetermined crank angle positions, for sending a second trigger signal to said third sensing means to cause same to start detecting the rotational speed of the engine.

* * * * *